United States Patent [19]

Shirian

[11] Patent Number: 4,619,291
[45] Date of Patent: Oct. 28, 1986

[54] DUCT FOR CABLE
[75] Inventor: Said Shirian, Forest Hills, N.Y.
[73] Assignee: Nynex Corporation, New York, N.Y.
[21] Appl. No.: 663,875
[22] Filed: Oct. 23, 1984
[51] Int. Cl.$^4$ ............................................. F16L 9/22
[52] U.S. Cl. ................................... 138/109; 138/117; 174/96; 358/901
[58] Field of Search ....................... 138/115, 116, 117; 285/137 R; 174/96; 358/901

[56] References Cited

U.S. PATENT DOCUMENTS

| | | | |
|---|---|---|---|
| 247,207 | 9/1881 | Mershon | 174/96 |
| 261,189 | 7/1982 | Walker | 138/116 |
| 407,102 | 7/1889 | Missud | 138/115 X |
| 470,237 | 3/1892 | Freeman | 138/115 X |
| 527,597 | 10/1894 | Edwards | 138/116 X |
| 586,282 | 7/1897 | Bleoo | 174/96 X |
| 695,594 | 3/1902 | Yarnall | 138/115 |
| 706,974 | 8/1902 | Lyle | 138/115 X |
| 722,249 | 3/1903 | Pixley | 285/28 |
| 1,093,766 | 4/1914 | Campfield | 138/115 X |
| 1,326,617 | 12/1919 | Stenwick | 138/115 |
| 2,340,926 | 2/1944 | Bradley | 285/137.1 |
| 3,413,021 | 11/1968 | Potts | 285/319 |
| 3,429,343 | 2/1969 | Steiro | 138/115 X |
| 3,767,232 | 10/1973 | Smith | 285/137 X |
| 3,899,005 | 8/1975 | Klimpl | 138/106 |
| 4,284,313 | 8/1981 | Anhalt | 285/137 X |

Primary Examiner—Stephen Marcus
Assistant Examiner—Mark Thronson
Attorney, Agent, or Firm—John J. Jordan; John J. Torrente

[57] ABSTRACT

A duct for carrying cable comprising a tubular member having a barrel portion and a larger diameter bell portion, the duct further comprising a member disposed in the barrel portion for segmenting the barrel portion into compartments, the segmenting member have a first section and a second section, the second section extending into the bell portion and being adapted to interfit with the first section.

17 Claims, 5 Drawing Figures

DUCT FOR CABLE

BACKGROUND OF THE INVENTION

This invention relates to ducts for housing cable and, in particular, to ducts for housing communication cable.

In the placing of conventional copper telephone cable, the cable is run through a duct which is used to house and protect the cable. Prior to placing the cable in the duct a cone shaped element is passed through the duct to clear away any debris and ensure a clear passage for the cable. Also attached to the cone is an end of a cable pull-line. Once the cone and attached end of the pull-line are through the duct, the other end of the line is affixed to a telephone cable and the cable pulled through the duct.

In order to pass the cone through the duct, a pressure differential is created in the duct. This requires that the individual components of the duct and their interconnections provide an air-tight passage. Otherwise, air leaks will occur and insufficient pressure will be developed to pull the cone through the line.

As the telephone industry has turned to the use of fiber optic cable for telephone transmission, it has had to develop techniques for placing the smaller diameter fiber optic cable. These techniques have continued to utilize the pressurized cone procedure for pulling cable through the ducts, since this procedure results in minimizing installation time.

At present, placing of fiber optic cable is accomplished by first pulling three one inch inner ducts through the usual four inch copper cable duct. The pressurized cone procedure is then used to pull a fiber optic cable through a first duct and to pull a small copper cable through a second duct. The copper cable is needed to provide talking channels between various installation points. The third inner duct serves as a spare, since it cannot be used without an associated cable for talking channels.

In many cases, the pulling of the three one inch ducts through the four inch duct is extremely difficult and in certain cases not possible to accomplish. This is particularly true where the four inch duct has vertical and horizontal bends. These bends may be created when placing the duct and may be a result of cable congestion and/or location.

In order to provide for an additional fiber optic cable in a conventional four inch duct and to avoid the material and labor costs of providing and pulling three inner ducts, it has now been proposed that the four inch duct itself be modified by segmenting the duct into four one inch compartments, two of which for receiving fiber optic cable and the other two of which for receiving associated talking channel copper cable. While such a segmented duct would increase the cable capacity by one and would not require separate inner ducts, the duct must also be designed so that pulling of each cable through its associated compartment can be achieved utilizing the aforementioned pressurized cone procedure. This requires that the individual compartments be air-tight and that the duct be connectible to like ducts in a manner to preserve this condition.

It would also be desirable if such a segmented duct could be further designed so that connection to similar ducts automatically aligns corresponding compartments. Finally, it would be advantageous if the duct could be made in long lengths, while still being capable of being cut to shorter lengths which when joined to similar ducts preserves the alignment as well as air-tightness of the corresponding compartments.

It is therefore an object of the present invention to provide a cable duct having one or more of the above-mentioned features.

It is a further object of the present invention to provide a segmented duct for fiber optic cable wherein the duct can be joined to similar ducts, while maintaining an air-tight condition for the individual compartments of the ducts.

It is yet a further object of the present invention to provide a duct of the last mentioned type which can be of long length and which can be cut into shorter lengths which can then be joined to similar ducts so as to maintain alignment of corresponding compartments and an air-tight condition.

SUMMARY OF THE INVENTION

In accordance with the principles of the present invention, the above and other objects are realized in a duct comprising a tubular member having a barrel portion and a bell portion, the latter bell portion having a diameter which is greater than that of the barrel portion, and means disposed in the barrel portion for segmenting the barrel portion into compartments. The segmenting means is itself comprised of a first section and a second section, the second section extending into the bell portion and having an end adapted to interfit with the first section.

In this manner, if the barrel portion of a first duct constructed in accordance with the invention is inserted into the bell portion of a second duct also constructed in accordance with the invention, the first section of the segmenting means of the first duct will interfit with the end of the second section of the segmenting means of the second duct. As a result, the ducts will be connected in a positive manner which tends to maintain the air-tight nature of the compartments at the connection point.

In further accord with the invention, the barrel portion and bell portion of the tubular member of the invention are provided with mating first and second alignment means. These alignment means are situated such that the interfitting of the first and second sections of first and second ducts is realized in a manner which automatically aligns corresponding compartments of the ducts once the alignment means are brought into mating relationship. By use of the alignment means in combination with the segmenting means and its interfitting first and second sections, connection of like ducts is thus realized in a way which automatically preserves compartment alignment and air-tightness.

In the embodiment of the invention to be disclosed hereinafter, the segmenting means comprises one or more pairs of spaced first walls which together form the first section. The second section comprises a single second wall for each pair of first spaced walls. Each single second wall has a thickness which is less than the spacing between its corresponding pair of spaced first walls so as to be able to tightly fit therebetween. The alignment means, on the other hand, comprises diametrically opposing flanges disposed on the barrel portion outer surface and an aligned slot in the bell portion for each such flange. Accordingly, when the flanges of the barrel portion of a first duct are inserted into the slots in the bell portion of a second duct, the second walls in the bell of the second duct will interfit between the corresponding spaced first walls in the barrel of the first duct to provide an interfitting tongue and groove like connection.

BRIEF DESCRIPTION OF THE DRAWINGS

The above and other features and aspects of the present invention will become more apparent upon reading the following detailed description, in conjunction with the accompanying drawings, in which.

DETAILED DESCRIPTION

Figure 1:
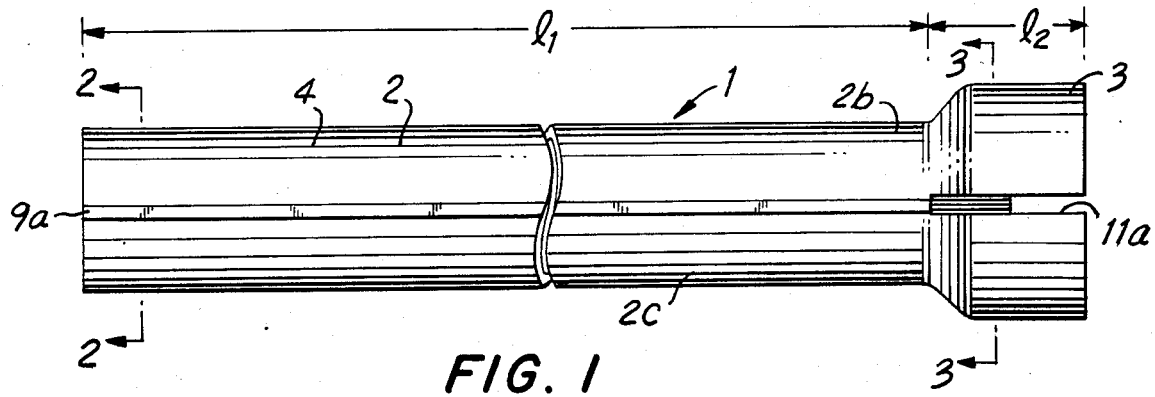
FIG. 1 shows a duct in accordance with the principles of the present invention.

In FIG. 1, the duct 1 is a duct made in accordance with the principles of the present invention. The duct 1 is in the form of a tubular member and comprises a cylindrical barrel portion 2 and a cylindrical bell portion 3. The barrel portion is of length $l_1$ and has inner and outer diameters $D_1$ and $D_2$. The bell portion 3 is of shorter length $l_2$ but of larger inner and outer diamter $D_3$ and $D_4$ then the barrel portion. The bell portion serves to receive the barrel portion of a like duct when these ducts are to be interconnected.

In accordance with the principles of the present invention, a segmenting means 4 is disposed within the barrel section 2. The segmenting means 4 includes a first section 4a which extends through the barrel portion 2 and which comprises a central element $4a_1$, and one or more pairs of first spaced walls, $4a_2$–$4a_5$. Each pair of spaced walls comprises like first walls $4a_6$ having a radially uniform spacing s over their entire lengths.

The walls $4a_6$ are flat and extend radially from the element $4a_1$ to the inner wall 2a of the barrel portion 2. They further extend axially over substantially the entire length of the barrel portion. They, therefore, divide the barrel portion into four separate and air-tight compartments 5, 6, 7 and 8, each suitable for receiving its own telephone cable.

Figure 3:
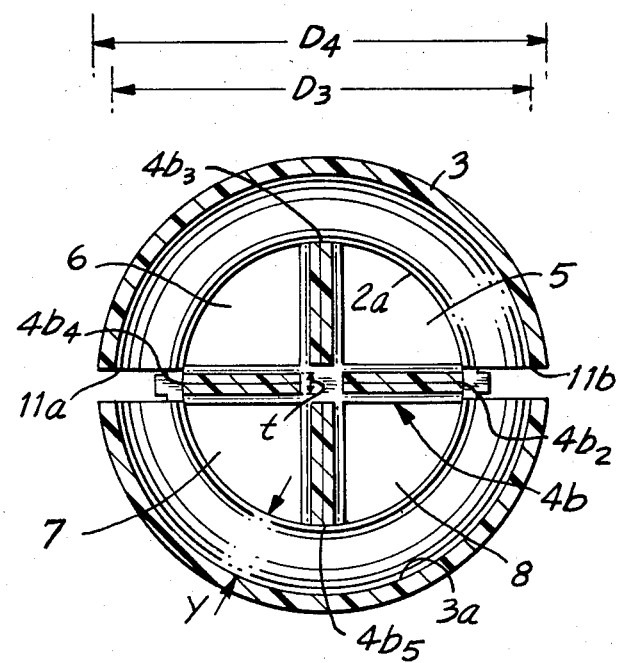
FIG. 3 shows a cross section of the duct of FIG. 1 taken along the line 3—3.
Figure 4:
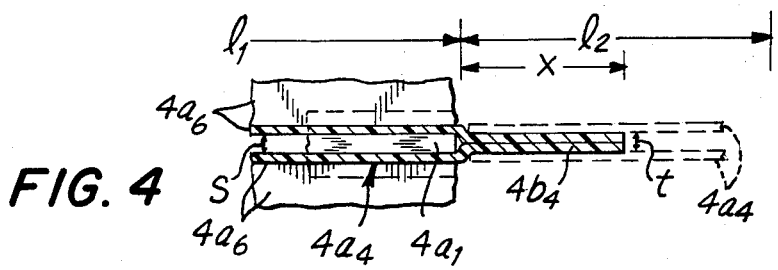
FIG. 4 shows the second section of the segmenting means of the duct of FIG. 1 which is utilized to connect the duct to other like ducts.

At the end 2b of the barrel 2 the segmenting means includes a second section 4b. This section is formed by bringing the pairs of walls $4a_2$–$4a_5$ together to form a set of single second walls $4b_2$–$4b_5$. As shown in FIG. 4, which, for simplicity, illustrates only the first pair of walls $4a_4$ and their corresponding second wall $4b_4$, the second walls $4b_2$–$4b_5$ extend into the bell for a distance x beyond the point of termination of the element $4a_1$. Furthermore, as shown in FIG. 3, these walls are spaced from the inner surface 3a of the bell by a distance y equal to one-half the difference between the inner diameter $D_1$ and the inner diameter $D_3$ of the barrel and bell portions 2 and 3, respectively.

In accordance with the invention, the end of the second section 4b of the segmenting means is adapted to interfit with the first section of the segmenting means. This is accomplished in the present case by selecting the thickness t of each of the single walls $4b_2$–$4b_5$ to be less than the spacing s between the corresponding pairs of walls $4a_2$–$4a_5$. Preferably, this difference is such that each pair of walls $4a_2$–$4a_5$ can be inserted over their corresponding wall $4b_2$–$4b_5$ in a tightly-engaging force-fitting manner.

In addition to the segmenting means 4, the barrel and bell portions 2 and 3 of the duct 1 are provided with cooperating alignment means. In particular, the barrel 2 supports on its outer surface 2c flanges 9a and 9b. These flanges are diametrically opposite and extend over the length of the barrel and in parallel with the opposing pairs of walls and $4a_2$ and $4a_4$. The bell 3, in turn, is provided with corresponding slots 11a and 11b in its wall. These slots run from the terminating point of the associated flange 9a and 9b to the end of the bell.

As can be appreciated, by utilizing the above-described configuration of the duct 1 for two or more ducts, these ducts can now be connected end-to-end such that corresponding compartments 5, 6, 7 and 8 of the ducts align and remain air-tight. In particular, by inserting the barrel portion of a first duct having the configuration of the duct 1 into the bell portion of a second duct also having this configuration, the spaced walls $4a_2$–$4a_5$ of the first duct align with and tightly fit over the walls $4b_2$–$4b_5$ of the second duct. This tongue and groove type fit, moreover, exists over the distance x (see FIG. 4) and, thus, provides a distance of approximately 2x over which air must now travel before it can leak into another compartment.

In actual practice, when two such ducts are to be joined, a cement material is applied to the barrel portion, including the pairs of walls $4a_2$–$4a_5$, of the first duct and to the bell portion, including the walls $4b_2$–$4b_5$, of the second duct. The ducts are then joined as aforementioned, resulting in cemented connections over the tongue and groove interfit of walls $4b_2$–$4b_5$ and spaced walls $4a_2$–$4a_5$. Because each of the connections is now over a distance 2x, the likelihood of leakage of air from one duct compartment to the next is greatly decreased, since it is highly unlikely that there would be a failure of the cement to adhere at all points over the entire 2x distance. Accordingly, an improved air-tight connection with automatic alignment is realized utilizing the configuration of the duct 1 of the invention.

It is also advantageous in accord with the invention to provide the barrel 2 of the duct 1 with a uniform cross section over its entire length $l_1$. By this measure, the duct 1 can be cut anywhere along its length and it will still have spaced walls $4a_2$–$4a_5$ at its cut end which will tightly fit the walls $4b_2$–$4b_5$ of another like duct. The shorter length duct can, thus, now be readily joined to another like duct in the manner described above to obtain a composite duct having aligned air-tight compartments.

Figure 2:
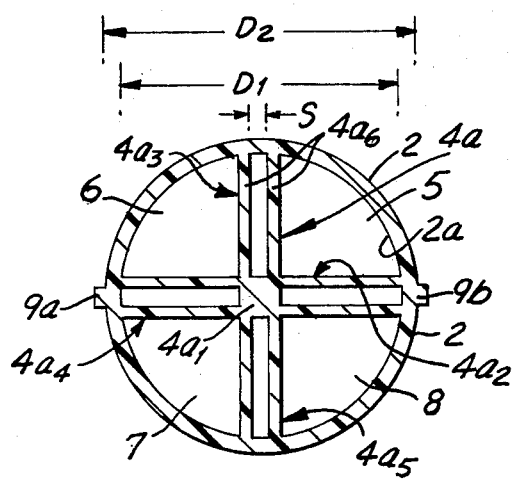
FIG. 2 shows a cross section of the duct of FIG. 1 taken across the line 2—2.
Figure 5:
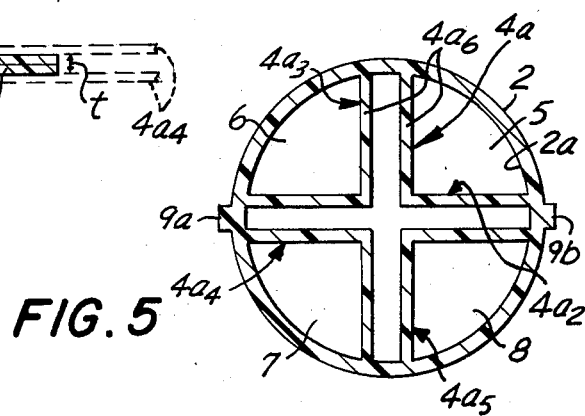
FIG. 5 shows a cross section similar to that of FIG. 2 of a modified version of the duct of FIG. 1.

FIG. 5 shows a cross-section similar to that of FIG. 2 of a duct like the duct of FIG. 2, except for a modification of the section 4a of the segmenting means 4. In particular, in FIG. 5, the section 4a has been modified by eliminating the element $4a_1$. As a result, each wall $4a_6$ of the pairs of walls $4a_2$–$4a_5$ intersects with a further wall $4a_6$ of another pair of walls in L-shaped configuration.

In practice of the invention, the bell and barrel portions and the segmenting means of the duct may be formed from an integral member comprised of polyvinyl chloride (PVC), fiberglass or similar types of materials. The pairs of walls $4a_2$–$4a_5$ of the segmented means, in turn, might typically have a thickness of 0.045 inches and a spacing of 0.10 inches. The walls $4b_2$–$4b_5$ in such case would have a thickness of approximately 0.09 inches. The lengths $l_1$ and $l_2$ might also be 20' and 3", respectively while the dimension x might be 0.5 inches. Finally, the cement used to join like ducts might be comprised of a solvent and plastic material. Conventional cements of this type are manufactured and sold by various manufacturers.

As above-indicated, the duct of the invention can be made in long lengths of approximately 20' or longer. As a result, the duct can undergo vertical and horizontal bending, thereby allowing for flexibility in connection. Furthermore, the supporting points provided by the walls $4a_6$ give the duct increased structural strength. It, therefore, is more resistant to deformation resulting from external pressures.

The duct of the invention provides significant cost advantages over the above-described prior procedure of utilizing three inner ducts in the conventional four inch duct. Firstly, material costs are reduced, since the need for three separate inner ducts is eliminated. Secondly, labor and operating costs are also reduced, since mobilization costs (opening and closing manholes, pumping water, testing for gas, etc.) are minimized and since placing and rodding of the three inner ducts is avoided. Finally, capital costs are reduced, since duct space is maximized and new construction can be avoided or at least delayed.

It should be noted that while the duct of the invention has been described in terms of its use in housing fiber optic communication cable, the duct of the invention can also be used to house any other types of cable. In particular, the duct can advantageously be used to house cable having comparable dimensions as fiber optic cable. Additionally, the duct can be used to house cable intended for underground as well as above the ground placement. The duct can also serve as a riser duct in new commercial or residential buildings where the allocated space for ducts is very limited.

In all cases, it is understood that the above-identified arrangement are merely illustrative of the many possible specific embodiments which represent applications of the present invention. Numerous and varied other arrangemnts can readily be devised in accordance with the principles of the present inventon without departing from the spirit and scope of the invention.

What is claimed is:

1. A duct for use in housing a cable comprising:
   a tubular member having elongated barrel and bell portions, the bell portion being of larger diameter than the barrel portion;
   and means disposed within said barrel portion for segmenting said barrel portion into compartments, said segmenting means having a first section in said barrel portion and a second section which follows said first section and extends into said bell portion, said first section having a first end in said barrel portion and extending therefrom through said barrel portion toward said bell portion to a second end of said first section, said first section comprising one or more pairs of spaced first walls extending along the length of said barrel portion, said second section having a first end which follows said second end of said first section and extends to a second end of said second section in said bell portion, said second end of said second section being of a configuration to interfit with said first end of said first section, and said second section comprising a second wall for each of said pairs of spaced first walls, each of said second walls following its corresponding pair of spaced first walls and having a thickness which is less than the spacing between the corresponding pair of first spaced walls.

2. A duct in accordance with claim 1 wherein said first section extends throughout substantially the entire length of said barrel portion;
   and said barrel portion is of uniform cross-section.

3. A duct in accordance with claim 1 further comprising:
   first and second mating alignment means included in said barrel and bell portions, respectively, said first and second alignment means being such that when a segment of said barrel portion including said first alignment means is removed from said barrel portion and inserted into said bell portion so that the first and second alignment means mate, the portion of the first section included in the removed segment becomes aligned with the second section in said bell portion so that each pair of first spaced walls in the removed segment aligns and interfits with the corresponding second wall in the bell portion to form sealed compartments.

4. A duct in accordance with claim 3 wherein:
   said first alignment means comprises one or more flanges disposed on the outer surface of said barrel portion;
   and said second alignment means comprises a slot in the wall of said bell portion for each of said one or more flanges.

5. A duct in accordance with claim 3 wherein:
   each of said first spaced walls is flat and extends substantially the entire length of said barrel portion;
   and each of said second walls is flat and extends from the end of the corresponding pair of spaced first walls into the bell portion.

6. A duct in accordance with claim 5 wherein:
   the thickness of each of said second walls differs from the spacing of the corresponding pair of spaced first walls such that each second wall can be tightly force fit between the corresponding pair of spaced first walls.

7. A duct in accordance with claim 6 wherein:
   the spacing between each pair of spaced first walls is uniform over the length of the barrel portion.

8. A duct in accordance with claim 7 wherein:
   the barrel portion is of uniform cross-section.

9. A duct in accordance with claim 5 wherein:
   said first section of said segmenting means comprises:
   first, second, third and fourth pairs of said spaced first walls, the walls of each of said pairs extending from the central region of said barrel portion to the inner surface of said barrel portion;
   and said second section of said segmenting means comprises:
   first, second, third and fourth second walls, said first, second, third and fourth second walls extending from said first, second, third and fourth pairs of spaced first walls, respectively, each of said first, second, third and fourth second walls being flat and the thickness of said first, second, third and fourth second walls being less than the spacing between said first, second, third and fourth pairs of spaced first walls, respectively.

10. A duct in accordance with claim 9 wherein:
    the thickness of each of said second walls differs from the spacing of the corresponding pair of spaced first walls such that each second wall can be tightly force fit between the corresponding pair of first spaced walls.

11. A duct in accordance with claim 10 wherein:
said first alignment means comprises one or more flanges disposed on the outer surface of said barrel portion;
and said second alignment means comprises a slot in the wall of said bell portion for each of said one or more flanges, each of said one or more slots being in alignment with a different one of said flanges.

12. A duct in accordance with claim 11 wherein:
said flanges extend over the length of said barrel portion, and said slots extend over the length of said bell portion.

13. A duct in accordance with claim 12 wherein:
said flanges are at least two in number and first and second of said flanges are in diametrically opposed positions on said barrel portion surface.

14. A duct in accordance with claim 13 wherein:
said barrel portion is of uniform cross section.

15. A duct in accordance with claim 14 wherein:
said cross section is circular.

16. A duct in accordance with claim 9 further comprising:
a member disposed centrally of said barrel portion, each of said walls of said pairs of spaced first walls extending from said member and said member terminating short of the ends of said second walls along the length of said barrel and bell portions.

17. A duct in accordance with claim 3 wherein:
the walls of each of said pairs of spaced first walls are brought together to form the corresponding second wall.

* * * * *